United States Patent [19]

Tsukiji

[11] Patent Number: 4,753,314

[45] Date of Patent: Jun. 28, 1988

[54] ATTACHMENT STRUCTURE FOR REAR WHEEL DAMPER OF MOTORCYCLE

[75] Inventor: Kensuke Tsukiji, Saitama, Japan

[73] Assignee: Honda Giken Kogyo Kabushiki Kaisha, Tokyo, Japan

[21] Appl. No.: 35,631

[22] Filed: Apr. 7, 1987

[30] Foreign Application Priority Data

Apr. 7, 1986 [JP] Japan .................................. 61-79564
Apr. 7, 1986 [JP] Japan .................................. 61-79565

[51] Int. Cl.$^4$ ............................................. B62K 25/04
[52] U.S. Cl. ..................................... 180/227; 280/284
[58] Field of Search ....................... 180/227, 219, 228; 280/284

[56] References Cited

U.S. PATENT DOCUMENTS 4,415,057 11/1983 Yamaguchi ......................... 180/227
4,511,013 4/1985 Miyakoshi et al. ................. 180/227
4,650,026 3/1987 Shiraishi ............................ 180/227

Primary Examiner—John A. Pekar
Attorney, Agent, or Firm—Irving M. Weiner; Joseph P. Carrier; Pamela S. Burt

[57] ABSTRACT

A rear wheel damper attachment structure in a motorcycle includes a first cross pipe extending transversely between main pipes of a motorcycle frame upwardly and rearwardly of the motorcycle engine, first and second attachment brackets projecting on the first cross pipe, a second cross pipe supported between the main pipes at lower portions thereof, third and fourth attachment brackets projecting on the second cross pipe, and a link mechanism interconnecting the rear wheel damper and the third and fourth attachment brackets. The rear wheel damper has an upper end pivotally coupled to the first and second attachment brackets and a lower end pivotally coupled to the link mechanism, whereby the rear wheel damper is tilted forwardly and upwardly.

4 Claims, 5 Drawing Sheets

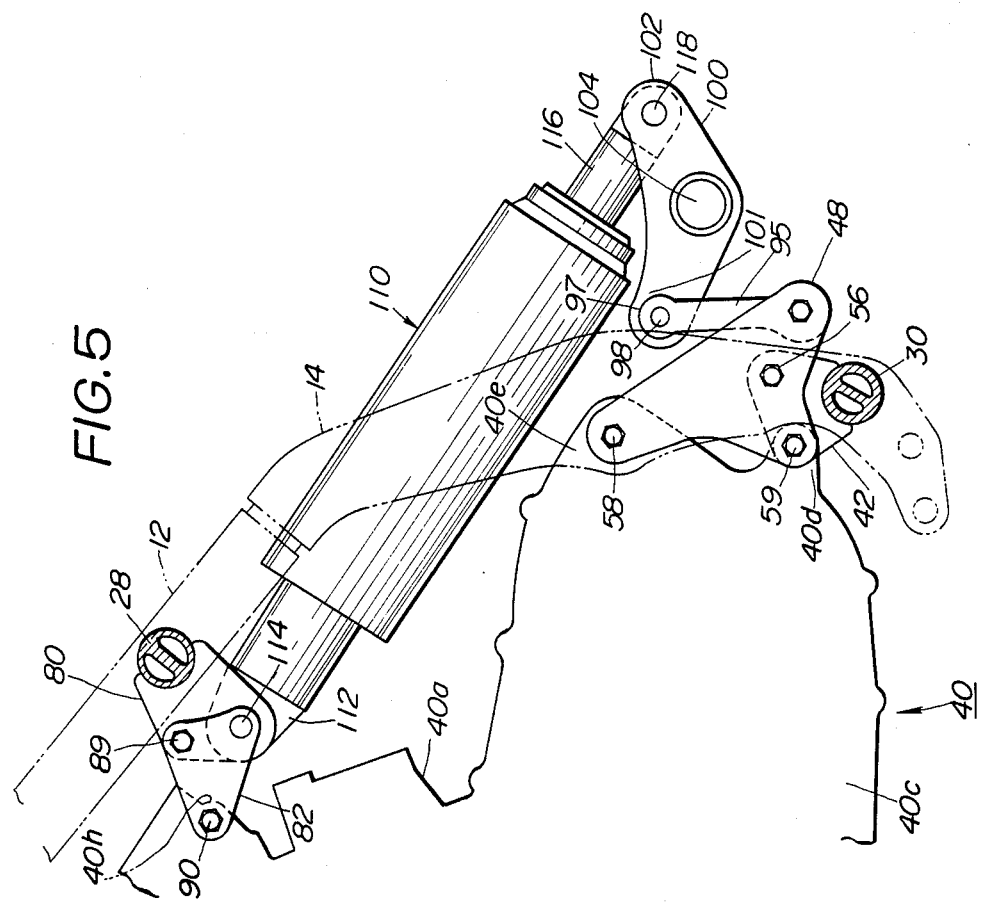

ATTACHMENT STRUCTURE FOR REAR WHEEL DAMPER OF MOTORCYCLE

BACKGROUND OF THE INVENTION

1. Field of the Invention

The present invention relates generally to a motorcycle, and more particularly to an attachment structure for the rear wheel damper of a motorcycle.

2. Description of the Relevant Art

One known rear wheel damper for use on motorcycles is of the so-called progressive type which produces a progressively increasing dampening force. The rear wheel damper of the progressive type is generally assembled in a motorcycle so that it extends substantially vertically between an upper frame portion and a rear fork. More specifically, the rear wheel damper has its upper end pivotally connected to the upper frame portion, i.e., a seat rail, and its lower end pivotally coupled to the rear fork through a link mechanism. The link mechanism has a portion supported on a pivot shaft on a bracket extending from a cross pipe supported transversely between the lower portions of laterally spaced main pipes.

With the damper erected substantially vertically, however, no sufficient space for installing a component such as a fuel tank or a battery therein is defined below the seat, and a considerably large load is imposed directly on the cross pipe when the damper is operated. The cross pipe is thus required to be of a large wall thickness and diameter in order to increase its mechanical strength. Therefore, the parts such as the bracket projecting from the cross pipe must also be increased in thickness. As a result, the weight of the overall motorcycle body is increased.

SUMMARY OF THE INVENTION

Accordingly, it is an object of the present invention to provide an attachment structure for the rear wheel damper of a motorcycle which defines a sufficient space below a seat while keeping a sufficient stroke for a rear wheel damper.

Another object of the present invention is to provide an attachment structure for the rear wheel damper of a motorcycle which prevents a concentrated load from being applied to a cross pipe on which the lower end of the rear wheel damper is pivotally mounted by a link.

According to the present invention, there is provided a rear wheel damper attachment structure in a motorcycle having a frame assembly including a front fork on which a front wheel is steerably supported, a head tube in which the front fork is rotatably supported, two laterally spaced main pipes extending substantially rearwardly and downwardly from the head tube, at least one down tube extending substantailly downwardly from the head tube, a seat rail extending substantially horizontally rearwardly from the main pipes and supporting a driver's seat, two laterally spaced rear pipes extending forwardly and downwardly from a rear portion of the seat rail toward lower portions of the main pipes, and a rear fork pivotally coupled to the main pipes and supporting a rear wheel, and an engine disposed between the main pipes and the down tube. The rear wheel damper attachment structure comprises a rear wheel damper, a first cross pipe extending transversely between the main pipes upwardly and rearwardly of the engine, first attachment means projecting on the first cross pipe, a second cross pipe supported between the main pipes at lower portions thereof, second attachment means projecting on the second cross pipe, and a link mechanism interconnecting the rear wheel damper and the second attachment means. The rear wheel damper has an upper end pivotally coupled to the first attachment means and a lower end pivotally coupled to the link mechanism, whereby the rear wheel damper is tilted forwardly and upwardly to define a sufficiently large space between the main pipes, the seat rail, and the rear pipes.

The engine has a front portion supported by brackets fixed to a lower portion of the down tube and a rear portion supported by the first and second attachment means.

The first attachment means comprises a pair of first brackets mounted on the first cross pipe in spaced relation to each other in an axial direction of the first cross pipe, a pair of second brackets fixed to outer sides, respectively, of the first brackets, and a first pivot shaft supported between the first and second brackets, the upper end of the rear wheel damper being pivotally supported on the first pivot shaft.

The second attachment means comprises a pair of third brackets mounted on the second cross pipe in spaced relation to each other in an axial direction of the second cross pipe, a pair of fourth brackets fixed to outer sides, respectively, of the third brackets and larger than the third brackets, and a second pivot shaft supported between the third and fourth brackets. The link mechanism comprises a first link pivotally supported on the second pivot shaft and a substantially arcuate second link having one end swingably coupled to the first link, the second link having a bifurcated opposite end supporting thereon a third pivot shaft, the lower end of the rear wheel damper being pivotally supported on the third pivot shaft.

Since the rear wheel damper is tilted forwardly and upwardly substantially parallel to the main pipes and a carburetor is attached to the rear portion of the cylinder head of the engine, a sufficiently large space is defined between the main pipes, the seat rail, and the rear pipes, and a fuel tnak or other component may be disposed in the space.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 5 is an enlarged side elevational view of the attachment structure of the invention.

DETAILED DESCRIPTION OF THE PREFERRED EMBODIMENT

Figure 1:
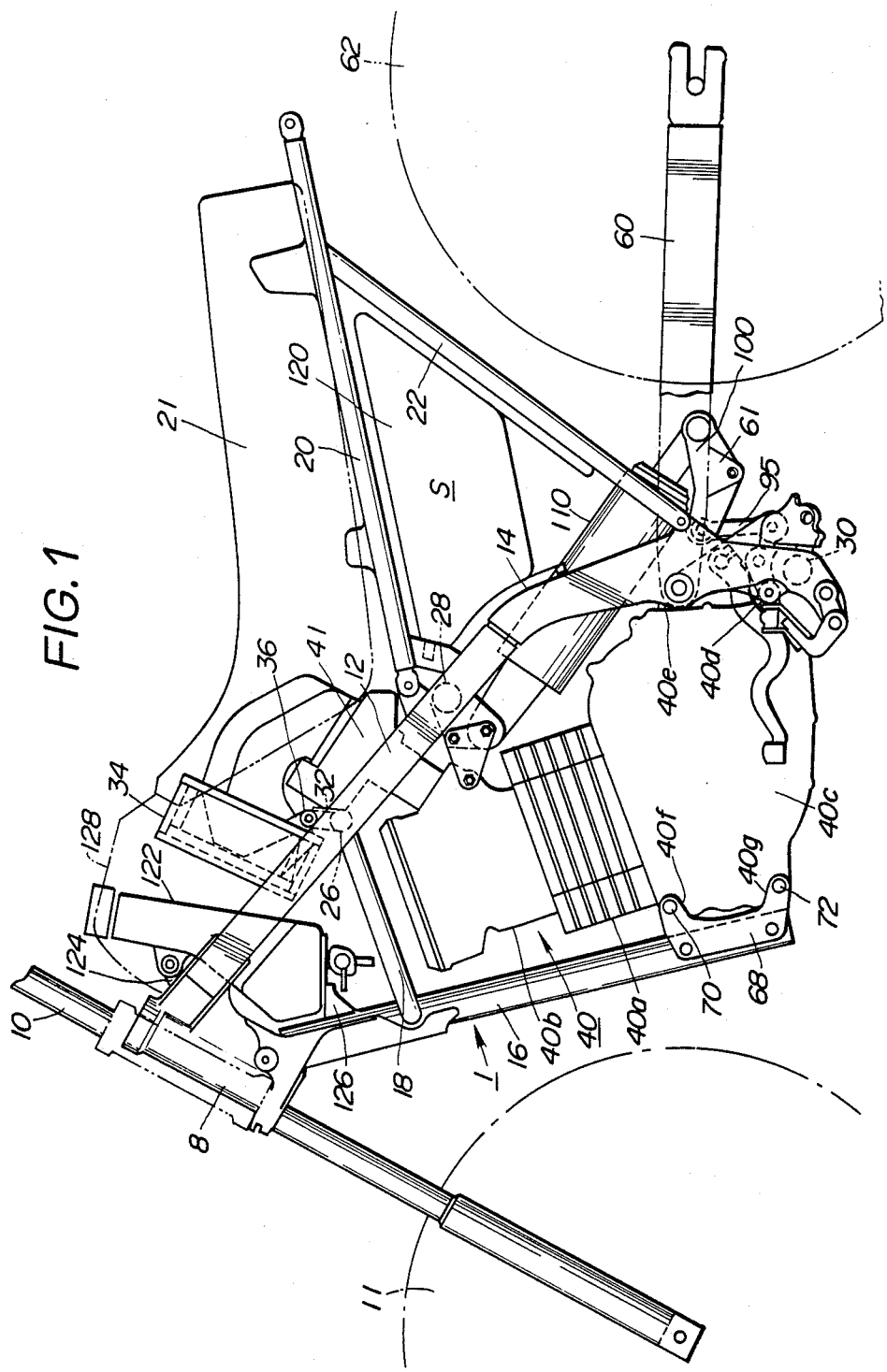
FIG. 1 is a fragmentary side elevational view of a motorcycle, showing an attachment structure for the rear wheel damper of the motorcycle according to the present invention.

As shown in FIG. 1, a frame assembly, generally designated by the reference numeral 1, of a motorcycle comprises a head tube 8 tilted slightly rearwardly in the upward direction and in which there is rotatably supported a front fork 10 with a front wheel 11 steerably supported thereon, a pair of laterally spaced main pipes 12 (also shown in FIG. 2) extending obliquely rearwardly and downwardly from the head tube 8 near its upper end, a pair of laterally spaced lower members 14 joined to the lower ends of the main pipes 12, respectively, and having a slightly curved shape, a down tube 16 (which is illustrated as a single down tube, but more than one down tube may be employed) extending downwardly from the lower end of the head tube 10, two braces or stiffening pipes 18 (only one shown) extending between the main pipes 12 and the down tube 16, a pair of laterally spaced seat rails 20 (only one shown) extending substantially horizontally rearwardly from substantially central portions of the main pipes 12 and supporting a driver's seat or saddle 21, and a pair of laterally spaced rear pipes 22 (only one shown) extending obliquely between and joined to the rear ends of the seat rails 20 and substantially central portions of the lower members 14.

Figure 2:
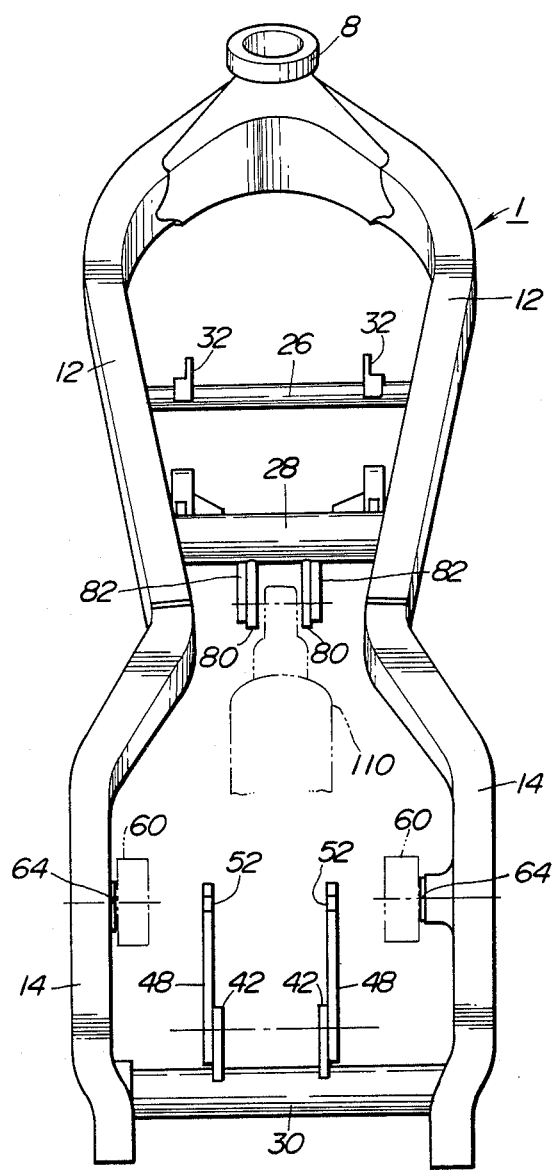
FIG. 2 is a fragmentary plan view of a frame of the motorcycle shown in FIG. 1.

As illustrated in FIG. 2, upper and middle cross pipes 26, 28 extend substantially horizontally between and are joined to the main pipes 12, and a lower cross pipe 30 extends substantially horizontally between and is joined to the lower members 14 near their lower ends. Two brackets 32 are mounted on the upper cross pipe 26 in spaced relation from each other in the axial direction of the upper cross pipe 26. An air cleaner 34 (FIG. 1) is fixed to the brackets 32 by means of a nut/bolt assembly 36.

An engine such as a single-cylinder two-cycle engine, generally denoted at 40 in FIG. 1, comprises a cylinder block 40a, a cylinder head 40b mounted on the top of the cylinder block 40a, and a crankcase 40c mounted on the bottom of the cylinder block 40a and housing a gear transmission (not shown) and a clutch (not shown) therein. The engine 40 is supported between the down tube 16, the main pipes 12 and the lower members 14. A carburetor 41 connected to the rear portion of the cylinder head 40b is coupled to the air cleaner 34.

Figure 3:
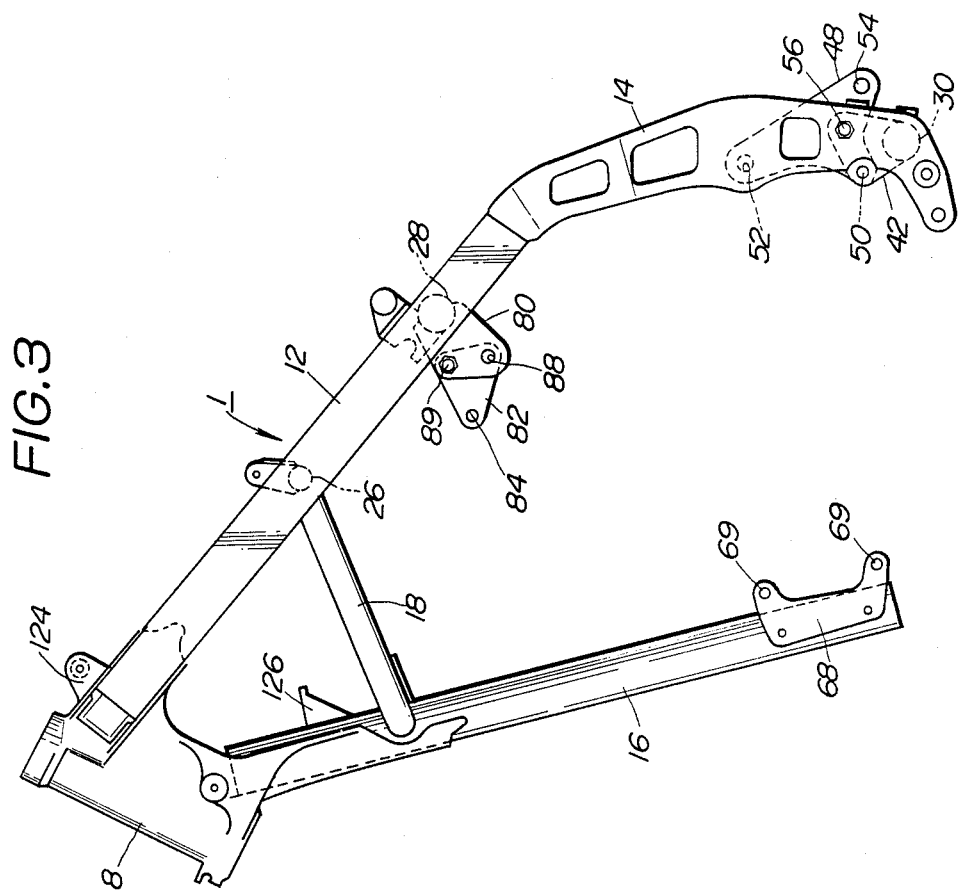
FIG. 3 is a fragmentary side elevational view of the frame of the motorcycle of FIG. 1.
Figure 4:
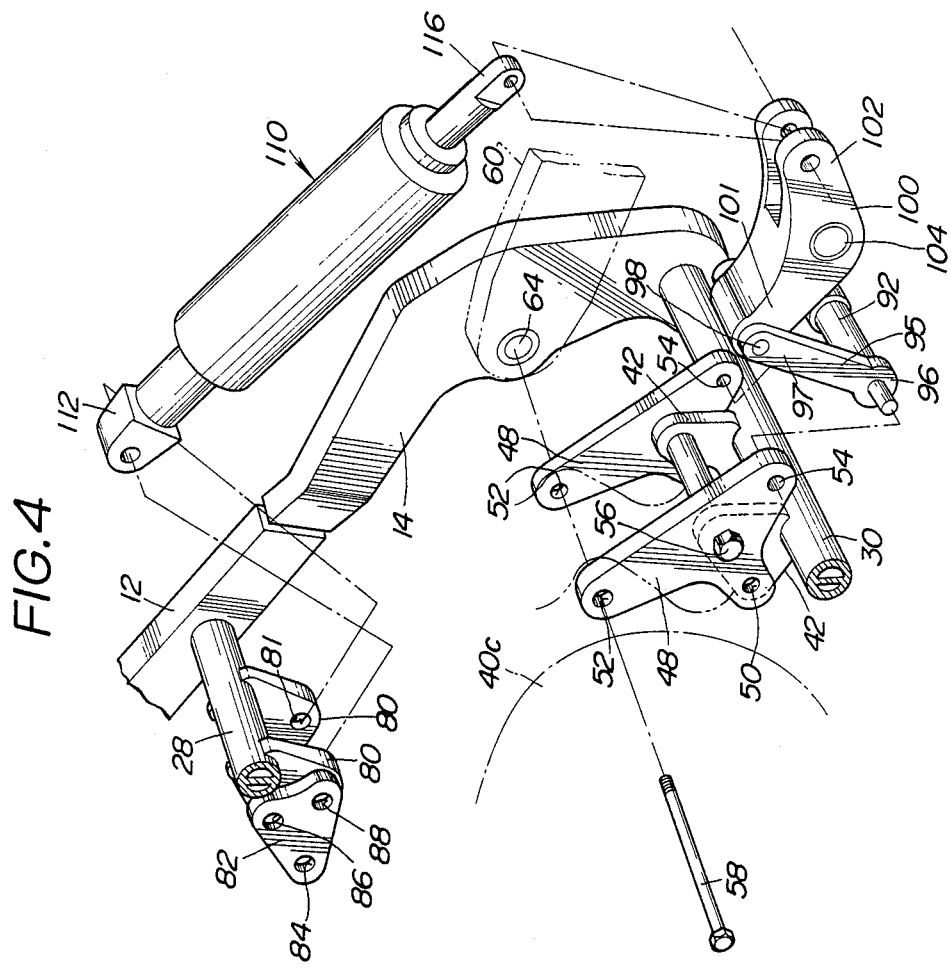
FIG. 4 is an enlarged perspective view of the attachment structure of the present invention.

The manner in which the engine 40 is installed on the frame assembly 1 will be described in detail with reference to FIGS. 3 through 5. Two smaller brackets 42 are fixedly mounted on the lower cross pipe 30 in spaced relation to each other in the axial direction of the lower cross pipe 30, each of the brackets 42 being of a substantially triangular shape and having holes (not shown) defined in corners thereof. Substantially triangular hangers or larger brackets 48 are disposed on the outer sides of the smaller brackets 42, respectively, each bracket 48 having holes 50, 52, 54 (FIG. 4) defined in corners thereof. The brackets 42, 48 are firmly secured to each other by means of a nut/bolt assembly 56. The holes 50 of the larger brackets 48 and the corresponding holes of the smaller brackets 42 are registered with a hole (not shown) defined in a boss 40d on a rear and lower portion of the crankcase 40c, and the holes 52 of the larger brackets 48 are registered with a hole (not shown) defined in a boss 40e on a rear and upper portion of the crankcase 40c. Bolts 58, 59 are then inserted through these registered holes, and nuts (not shown) are threaded over the bolts 58, 59 to connect the brackets 42, 48 to the crankcase 40c. As shown in FIG. 4, a rear fork 60 which supports a rear wheel 62 is pivotally supported on the lower members 14 at 64 by the bolt 58 in coaxial relation to the holes 52 of the larger brackets 48.

Referring back to FIG. 1, the crankcase 40c also has bosses 40f, 40g on its front upper and lower portions. The down tube 16 has two bifurcated brackets (only one shown) 68 having holes 69 (FIG. 3) held in registry with holes (not shown) defined in the bosses 40f, 40g of the crankcase 40c. The brackets 68 are fastened to the bosses 40f, 40g by means of nut/bolt assemblies 70, 72 inserted through the holes 69 and the holes in the bosses 40f, 40g. Although two brackets are employed as attachment members in each of the bracket assemblies for increased rigidity and mechanical strength, only one bracket may be employed in each bracket assembly.

The middle cross member 28 has two substantially triangular brackets 80 spaced axially thereof and projecting downwardly, each bracket 80 having holes (only a hole 81 is shown in FIG. 4) defined in corners thereof. Two substantially triangular engine attachment brackets 82 are disposed on the outer sides of the brackets 80, respectively, each bracket 82 having holes 84, 86, 88 (FIG. 4) defined in corners thereof. The brackets 80, 82 are firmly secured to each other by means of a nut/bolt assembly 89. As shown in FIG. 5, a hole (not shown) defined in a boss 40h of the cylinder head 40b is registered with the holes 84 of the engine attachment brackets 82, which are then fastened to the boss 40h by means of a nut/bolt assembly 90 to support the upper portion of the engine 40.

As illustrated in FIGS. 4 and 5, a first barshaped link 95 has one end 96 swingably mounted on a pivot shaft 92 inserted through and extending between the holes 54 of the larger brackets 48. A substantially arcuate second link 100 has one end 101 swingably coupled to the other end 97 of the first link 95 through a pivot shaft 98. The other end 102 of the second link 100 is of a bifurcated shape and has an intermediate portion pivotally mounted on a bracket 61 (see FIG. 1) fixed between the two laterally spaced members of the rear fork 60.

A rear wheel damper 110 which produces progressively increasing dampening forces, known as a progressive damper in the art, has an upper joint 112 on its upper end which is swingably coupled to a pivot shaft 114 extending transversely between the brackets 80 and a lower joint 116 on its lower end which is rotatably coupled to the bifurcated end 102 of the second link 102 through a pivot shaft 118. The rear wheel damper 110 thus extends substantially parallel to the main pipes 12, i.e., is tilted forwardly in the upward direction. Therefore, as shown in FIG. 1, a sufficiently large space S is defined which is surrounded by and between the seat rails 20, the rear pipes 22, and the lower members 14. While a main fuel tank 120 is disposed in the space S in the illustrated embodiment, a battery or a tool box may instead be disposed in the space S. An auxiliary fuel tank 122 is supported on a bracket 124 projecting from the upper portion of the head tube 10 and a bracket 126 projecting from the down tube 16. The auxiliary fuel tank 122 is covered with a cover 128 extending from the front end of the seat 21.

When the rear wheel 62 bounces to move the rear fork 60 upwardly while the motorcycle of FIG. 1 is running on a rough road, for example, the second link 100 is rotated counterclockwise about the intermediate portion 104 thereof. The rear wheel damper 110 is now compressed or shortened to produce suitable dampening forces. At this time, the first link 95 is moved downwardly to apply a load to the lower cross pipe 30. Since part of such a load applied to the lower cross pipe 30 is distributed to the brackets 42, 48 and hence to the crankcase 40c of the engine 40, the entire load is not imposed on the lower cross pipe 30. Any load applied from the upper end of the damper 110 to the middle cross pipe 28 is also distributed to the brackets 80, 82 and hence the cylinder head 40b of the engine 40. Thus, the load impressed on the middle cross pipe 28 is also reduced.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A motorcycle comprising a frame assembly including a front fork on which a front wheel is steerably supported, a single head tube in which said front fork is rotatably supported, two laterally spaced main pipes extending rearwardly and downwardly from said head tube, at least one down tube extending substantially downwardly from the head tube, a pair of laterally spaced seat rails extending substantially horizontally rearwardly from said main pipes and supporting a driver's seat, two laterally spaced rear pipes extending between said seat rails near rear ends thereof and said main pipes, and a rear fork pivotally coupled to said main pipes at lower portions thereof and supporting a rear wheel, first, second, and third cross pipes supported on said main pipes, two first attachment members fixed to said first cross pipe and supporting an air cleaner, at least two second attachment members fixed to said second cross pipe, at least two third attachment members fixed to said third cross pipe, at least two fourth attachment members fixed to a lower portion of said down tube, an engine supported by said second, third, and fourth attachment members, a carburetor connected to an upper portion of said engine, a link mechanism comprising a first bar-shaped link pivotally coupled to said third attachment members and a substantially arcuate second link having one end swingably coupled to said first link and an intermediate portion swingably coupled to said rear fork by a bracket, and a single rear wheel damper, said rear wheel damper having an upper end pivotally coupled to said second attachment members and a lower end pivotally coupled to an opposite end of said second link, said rear wheel damper being tilted forwardly and upwardly substantially parallel to said main pipes, said carburetor being disposed disposed on an upper rear portion of said engine, whereby a sufficiently large space is defined between said main pipes, said seat rail, and said rear pipes.

2. A motorcycle according to claim 1, further including a fuel tank disposed in said space.

3. A motorcycle according to claim 1, wherein said third attachment members are connected to said engine in coaxial relation to a position where said rear fork is pivotally coupled to said main pipes.

4. In a structure for supporting a rear wheel damper in a motorcycle including a frame assembly having a head tube, two laterally spaced main pipes extending rearwardly and downwardly from said head tube, at least one down tube extending substantially downwardly from said head tube, a rear fork including two members, each member having one end pivotally connected to said main pipes and the other end supporting a rear wheel, and an engine disposed between said main pipes and said at least one down tube, the improvement comprising:

an upper cross pipe extending transversely between said main pipes;

first supports connected to said upper cross pipe and supporting an upper portion of said engine;

a lower cross pipe extending transversely between said main pipes; and second supports connected to said lower cross pipe and supporting a lower portion of said engine;

said rear wheel damper extending substantially parallel to said main pipes and having one end pivotally connected to said first supports and an opposite end pivotally connected to said second supports through a link mechanism pivotally connected to said members of the rear fork.

* * * * *

UNITED STATES PATENT AND TRADEMARK OFFICE
CERTIFICATE OF CORRECTION

PATENT NO. : 4,753,314
DATED : June 28, 1988
INVENTOR(S) : Tsukiji

It is certified that error appears in the above-identified patent and that said Letters Patent is hereby corrected as shown below:

Column 1, line 55, correct the spelling of --substantially--.
Column 2, line 42, change "tnak" to --tank.
Column 4, line 30, change "barshaped" to --bar-shaped--;
Column 4, line 46, after "link" change "102" to --100--.
Column 6, line 10 (claim 1, line 35), delete "disposed" (one occurrence).

Signed and Sealed this

Seventeenth Day of January, 1989

Attest:

DONALD J. QUIGG

Attesting Officer

Commissioner of Patents and Trademarks